(12) United States Patent
Anton et al.

(10) Patent No.: US 11,073,022 B2
(45) Date of Patent: Jul. 27, 2021

(54) TURBINE BLADE COMPRISING A COOLING STRUCTURE AND ASSOCIATED PRODUCTION METHOD

(71) Applicant: Siemens Aktiengesellschaft, Munich (DE)

(72) Inventors: Reiner Anton, Berlin (DE); Georg Bostanjoglo, Berlin (DE); Arturo Flores Renteria, Berlin (DE); Jacek Grodzki, Berlin (DE); Robert Herfurth, Berlin (DE); Eckart Schumann, Berlin (DE); Silke Settegast, Berlin (DE); Rüstü Söl, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 248 days.

(21) Appl. No.: 16/083,989

(22) PCT Filed: Mar. 22, 2017

(86) PCT No.: PCT/EP2017/056790
§ 371 (c)(1),
(2) Date: Sep. 11, 2018

(87) PCT Pub. No.: WO2017/167615
PCT Pub. Date: Oct. 5, 2017

(65) Prior Publication Data
US 2020/0291788 A1     Sep. 17, 2020

(30) Foreign Application Priority Data
Mar. 31, 2016  (DE) .......................... 102016205320.5

(51) Int. Cl.
*F01D 5/14* (2006.01)
*F01D 5/18* (2006.01)
(Continued)

(52) U.S. Cl.
CPC .......... *F01D 5/186* (2013.01); *F05D 2230/31* (2013.01); *F05D 2240/30* (2013.01); *F05D 2260/202* (2013.01)

(58) Field of Classification Search
CPC .......... F01D 5/186; F01D 5/187; F01D 5/188; F01D 5/189; F01D 5/20; F01D 5/225;
(Continued)

(56) References Cited

U.S. PATENT DOCUMENTS 3,854,842 A   12/1974 Caudill
4,411,597 A   10/1983 Koffel et al.
(Continued)

FOREIGN PATENT DOCUMENTS

CN   101769171 A   7/2010
EP   1355760        5/2005
(Continued)

OTHER PUBLICATIONS

International Search Report dated Jun. 14, 2017, for PCT/EP2017/056790.

*Primary Examiner* — Igor Kershteyn

(57) ABSTRACT

A turbine blade has a blade tip, a cooling structure with cooling channels which are designed to have cooling fluid passed through them in order to cool the turbine blade during operation, an end section at a lower level than that of the blade tip, and an outer wall section extending up to the blade
(Continued)

tip. The cooling structure is formed between the end section and the blade tip. A method produces a cooling structure of this type.

11 Claims, 3 Drawing Sheets

(51) Int. Cl.
  *F01D 5/20* (2006.01)
  *F01D 11/12* (2006.01)
  *F01D 11/20* (2006.01)

(58) Field of Classification Search
  CPC .......... F01D 5/181; F01D 11/12; F01D 11/20; F05D 2230/31; F05D 2230/22; F05D 2240/30; F05D 2240/307; F05D 2260/202; F05D 2260/203; F05D 2260/204
  USPC .......................................................... 416/92
  See application file for complete search history.

(56) References Cited

U.S. PATENT DOCUMENTS

| | | | | |
|---|---|---|---|---|
| 4,589,823 A | * | 5/1986 | Koffel | F01D 5/20 |
| | | | | 415/173.4 |
| 6,135,715 A | * | 10/2000 | Correia | F01D 5/20 |
| | | | | 416/97 R |
| 8,366,394 B1 | * | 2/2013 | Liang | F01D 5/288 |
| | | | | 416/97 R |
| 10,400,608 B2 | * | 9/2019 | Coomer | F01D 5/3007 |
| 2002/0141868 A1 | | 10/2002 | Lee et al. | |
| 2004/0056022 A1 | | 3/2004 | Meiners et al. | |
| 2006/0222492 A1 | | 10/2006 | Gross | |
| 2010/0166566 A1 | | 7/2010 | Hatman | |
| 2014/0072448 A1 | | 3/2014 | Prue et al. | |
| 2015/0104326 A1 | | 4/2015 | Waldman et al. | |
| 2016/0053625 A1 | | 2/2016 | Fisk et al. | |

FOREIGN PATENT DOCUMENTS

| | | |
|---|---|---|
| EP | 2863012 A1 | 4/2015 |
| WO | 02060635 A1 | 8/2002 |
| WO | 2015017742 A1 | 2/2015 |

* cited by examiner

TURBINE BLADE COMPRISING A COOLING STRUCTURE AND ASSOCIATED PRODUCTION METHOD

CROSS REFERENCE TO RELATED APPLICATIONS

This application is the US National Stage of International Application No. PCT/EP2017/056790 filed 22 Mar. 2017, and claims the benefit thereof. The International Application claims the benefit of German Application No. DE 102016205320.5 filed 31 Mar. 2016. All of the applications are incorporated by reference herein in their entirety.

FIELD OF INVENTION

The present invention relates to a turbine blade, such as a rotor blade of a gas turbine or of a steam turbine. In particular, the present invention relates to the configuration of a blade tip, manufactured by means of additive manufacturing technology, of a turbine blade.

BACKGROUND OF INVENTION

Turbine blades, in particular rotor blades, generally have, at the blade tip, what is known as an end portion, on which an encircling, or outer freestanding wall of the turbine blade is usually present.

Turbine blades are known for example from EP 2 863 012 A1.

Known additive or generative manufacturing methods are selective laser melting (SLM), selective laser sintering (SLS), and electron beam melting (EBM). Here, the corresponding component is produced by iterative joining of layers, layer elements or volume elements of a starting material. Typical layer thicknesses are between 20 µm and 60 µm.

A method for selective laser melting is known for example from EP 1 355 760 B1.

It is known that turbine blades of the first turbine stages are exposed to particularly high thermal loads. The thermal loads and mechanical loads which are caused by what are known as rubbing processes, i.e. instances of mechanical contact of the blade tip with a surrounding stator part or housing part, regularly result in the blade tip of the blade becoming worn, in particular as a result of an increased risk of oxidation and corrosion.

On account of the temperature difference between the tip of a turbine blade and the base, which can be up to 150 K, thermomechanical stresses, and thus possible crack formation in the rubbing edge, can also occur during operation.

The abovementioned wear phenomena furthermore often result in the formation or enlargement of what is known as the "radial gap" in the turbine. This directly results in a loss of hot gas stream and thus in a performance or efficiency loss of the entire system. Frequently, the rubbing edge of the blades of gas turbines is ground to a particular height for example after the entire blade has been coated, and is thus adapted, such that a protective coating, for example a thermal barrier layer and/or oxidation-resistant layer, is no longer present. In this sense, the indicated problem of wear is directly associated with the manufacture of turbine blades.

SUMMARY OF INVENTION

Therefore, it is an object of the present invention to specify means which prevent or substantially limit the wear of the blade tip of turbine blades.

This object is achieved by the subject matter of the independent claims. Advantageous configurations are the subject matter of the dependent claims.

One aspect of the present application relates to a turbine blade comprising a blade tip and a cooling structure, which advantageously comprises a plurality of cooling ducts, which are furthermore configured to have a cooling fluid flowing through them during operation in order to cool the turbine blade, in particular a tip-side portion of the turbine blade (blade tip). The cooling fluid is known to be a process gas compressed by a compressor unit.

In one configuration, the blade tip and/or the cooling structure are configured to form a rubbing edge during operation of the turbine blade. Advantageously, a rubbing edge of the turbine blade is formed at least partially by the blade tip.

The turbine blade furthermore comprises an end portion that is recessed with respect to the blade tip. In other words, the end portion can be arranged further in compared with the blade tip in a radial direction of the turbine blade or be spaced apart from the blade tip.

The turbine blade furthermore comprises an outer wall portion which extends as far as the blade tip, wherein the cooling structure is formed between the end portion and the blade tip.

In conventional turbine rotor blades, the outer wall portion advantageously forms the blade tip and thus the rubbing edge.

The turbine blade is advantageously configured such that the cooling fluid flows through the turbine blade advantageously along a longitudinal axis, i.e. radially, during operation.

As a result of the configuration of the cooling structure and/or of the cooling ducts, the blade tip can be cooled particularly effectively, and thus wear of the blade tip during operation of the turbine blade—compared with conventional turbine blades—can be at least significantly reduced. In particular, the turbine blade can advantageously be cooled according to the invention such that oxidation and/or corrosion of the blade tip during operation is prevented. As a result, the blade can advantageously continue to be operated with little need for maintenance or repair for a relatively long time, thereby increasing the availability, usability or efficiency of the corresponding turbine.

In one configuration, the cooling structure comprises a lattice structure which forms a multiplicity of cooling ducts. Said cooling ducts are advantageously open cooling ducts which—as a result of the configuration of the lattice structure—are fluidically connected together. The lattice structure forms in particular a particularly large surface area for the cooling structure, thereby allowing particularly efficient cooling of the turbine blade or the blade tip thereof.

In one configuration, dimensions and/or diameters of the individual cooling ducts formed by the lattice structure are each between 0.1 mm and 1 mm.

On account of the abovementioned dimensions, the cooling structure is advantageously unable to be produced either with conventional, for example chip-removing, machining methods or—on account of its structural complexity—by casting.

In one configuration, the turbine blade, the cooling structure and/or the outer wall portion are produced or producible by an additive (layer-by-layer) manufacturing method, advantageously by selective laser melting. The advantage of an additive or generative manufacturing method resides in the possibility of manufacturing components with particularly complicated geometries.

In one configuration, the cooling structure comprises a plurality of cooling ducts that are fluidically separated from one another. This configuration advantageously allows cooling of the blade tip during operation of the turbine blade that is tailored and/or specifically adapted by the geometry of the cooling ducts.

In one configuration, the end portion has one or more cooling-air bores, which advantageously allow what is known as impingement cooling during operation of the turbine blade, in particular when a cooling medium is passed or flows radially from the inside to the outside through the turbine blade and meets the end portion. According to this configuration, the cooling structure can particularly expediently have cooling fluid flowing through it, which is provided at least partially for the impingement cooling in any case.

In one configuration, the turbine blade is configured such that the cooling structure extends, advantageously along the entire length, from the end portion to the blade tip. As a result of this configuration, it is advantageously possible for the turbine stages that are impacted in each case to be kept "tight" for the cooling fluid and for the formation or enlargement of radial gaps—as described—to be prevented.

In one configuration, the turbine blade is configured such that the cooling structure extends along a cross section of the turbine blade, for example from the pressure side to the suction side and from a leading-edge face to a trailing-edge face over the entire blade tip or the cross section thereof. As a result of this configuration, in particular the entire cross section of the turbine blade is cooled, such that it is also possible for wear of the turbine blade to be prevented advantageously across the entire cross section (see above).

In one configuration, the cooling structure is formed at least partially in the outer wall portion. As a result of this configuration, the cooling of the turbine blades can advantageously take place over a wide region between the pressure side and suction side of the turbine blade.

In one configuration, an outlet of the cooling ducts leads into the blade tip. This configuration particularly expediently allows the cooling of the turbine blade and/or of the blade tip over the entire radial region. In particular, this configuration is expedient in order to protect particularly the rubbing edge of the turbine blade from wear. Moreover, during operation of the turbine blade, advantageously a sealing-air cushion or a flow of sealing air, which can particularly expediently seal off the radial gap in the turbine, forms directly at the rubbing edge.

In one configuration, the outer wall portion is a closed, for example circumferential, wall portion of the turbine blade. In other words, the outer wall portion can extend substantially (for example apart from an outlet region in the vicinity of the trailing edge of the turbine blade) around the entire circumference, i.e. both on the pressure side and on the suction side. The outer wall portion can represent in particular an extension of the pressure side and of the suction side of the turbine blade.

In one configuration, the cooling structure is at least partially enclosed by the outer wall portion.

In one configuration, the turbine blade comprises, between the blade tip and the end portion, a plurality of, advantageously closed, inner walls or walls arranged within the cross section. As a result of the provision of the inner walls, it is advantageously possible for a multiple leading edge to be formed for the turbine blade. As a result, a rubbing region of the turbine blade is advantageously embodied in a particularly robust manner and thermal and/or mechanical wear of the blade tip is prevented particularly effectively, since in particular the probability of not every one of the provided inner walls being degraded by mechanical wear, oxidized or corroded over the cross section of the turbine blade is increased.

In one configuration, the inner walls extend through the cooling structure, advantageously from the end portion along the entire length of the blade tip.

In one configuration, the cooling structure has a bionically or biomimetically designed and/or optimized structure. As a result of this configuration, the blade tip of the turbine can be optimized advantageously with regard to mechanically or thermally expected operational load, for example by a corresponding simulation process. The abovementioned structures are not producible by conventional manufacturing methods for components, subjected to hot gas, of turbines. As a result of the use of the above-described additive manufacturing technology, the advantages of the manufacturing method and the advantages of the specifically designed bionic structures for the turbine technology can be exploited synergistically.

In one configuration, the blade tip has a thermal barrier layer and/or oxidation-resistant layer.

A further aspect of the present invention relates to a method for producing the cooling structure for a turbine blade, for example a turbine blade of the described type, comprising the additive buildup of the cooling structure at the end portion of the turbine blade, for example in order to repair a worn blade tip in a servicing or repair step of the turbine blade. The cooling structure is additively built up on the end portion advantageously such that the cooling ducts are formed, which are configured to have a cooling fluid flowing through them during operation in order to cool the turbine blade. As a particular advantage of the described method, it is possible in particular not only to make turbine blades of the prior art functional again, but also to make use of the particular inventive advantages for the repaired turbine blade, in particular improved cooling of the blade tip and/or improved efficiency of the entire turbine as a result of reduced radial gaps.

Configurations, features and/or advantages which relate in the present case to the turbine blade or the blade tip, can also apply to the method for additive manufacturing, and vice versa.

BRIEF DESCRIPTION OF THE DRAWINGS

Further details of the invention are described in the following text with reference to the drawing. Identical or corresponding drawing elements are each provided with identical reference signs in the individual figures.

DETAILED DESCRIPTION OF INVENTION

Figure 1:
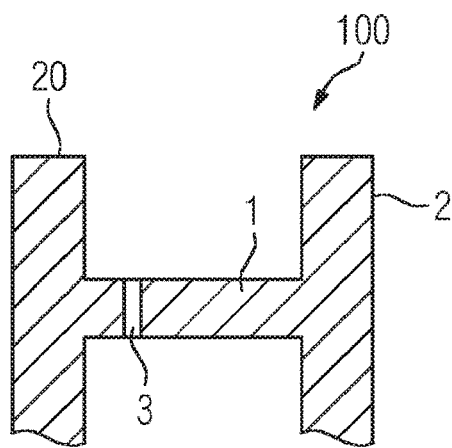
FIG. 1 schematically shows a cross section through a part of a turbine blade of the prior art.

FIG. 1 shows a perspective view of a portion of a turbine blade of the prior art. Specifically, an H-shaped profile of a tip-side portion of the turbine blade is indicated, which is identified in the following text by the reference sign 100, synonymously with the turbine blade.

Furthermore, the turbine blade has a blade tip identified by the reference sign 20. Synonymously with the blade tip 20, a rubbing edge or a corresponding rubbing face can be identified. The lower part of the turbine blade 100 is not shown in the present figures, in particular in the cross-sectional depictions.

The turbine blade 100 has an end portion 1. The end portion 1 is advantageously recessed with respect to the blade tip 20. The end portion 1 denotes a vertical portion of the profile shown in FIG. 1. Furthermore, the turbine blade has an outer wall portion 2, which encloses the end portion 1. The outer wall portion 2 can also be subdivided into a plurality of outer wall portions 2. The cross-sectional illustration illustrates two parts/regions of the outer wall portion. The outer wall portion extends expediently between the end portion 1 and the blade tip 20.

Furthermore, the end portion 1 has one or more cooling-air bores 3. Through the cooling-air bores 3, it is advantageously possible for a cooling fluid to flow, in order to cool that tip-side portion of the blade that is highly loaded by the operating temperatures during operation of the turbine blade. Advantageously, the outer wall portion 2 represents an extension of side walls of the turbine blade, in particular an extension of the pressure side and the suction side of the turbine blade.

Figure 2:
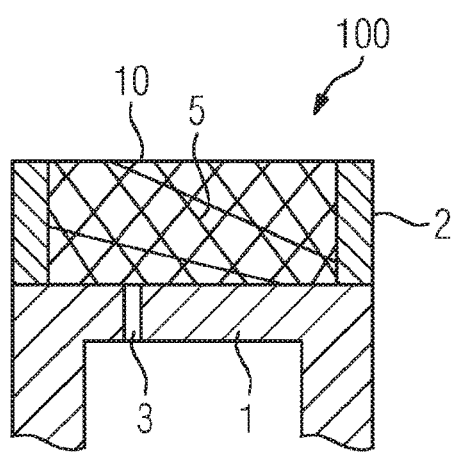
FIG. 2 schematically shows a cross section through a part of a turbine blade (blade tip) of the present invention.

FIG. 2 shows a schematic sectional view of a tip-side portion or end portion of a turbine blade 100 according to the present invention. The tip-side portion can advantageously denote at least one portion of the turbine blade 100 between the end portion 1 and the blade tip 20. The turbine blade 100 or the abovementioned portion comprises, in addition to the features shown in FIG. 1, a cooling structure 10. The cooling structure 10 is formed in particular between the end portion 1 and the blade tip 20. Advantageously, the cooling structure 10 extends along the entire length between the end portion 1 and the blade tip 20. In FIG. 2, the actual blade tip 20, or the rubbing edge or the rubbing region, extends over the entire cross section (horizontal direction) of the turbine blade 100 as a result of the configuration of the cooling structure 10.

In FIG. 1, the cooling structure 10 fills the entire region between the end portion 1 and the outer wall portion 2. In this sense, the cooling structure 10 advantageously likewise extends substantially over the entire width of the cross-sectional illustration in FIG. 1, i.e. over the entire width of the turbine blade between the outer wall portions 2 shown.

The cooling structure 10 comprises a plurality of cooling ducts 5, which are configured to have a cooling fluid (not explicitly indicated) flowing through them during operation of the turbine blade in order to cool the turbine blade 100 and/or the entire portion identified. The cooling fluid is expediently a process gas at a temperature lower than a hot-gas or operating temperature of the corresponding turbine.

In FIG. 2, the cooling ducts are formed by a lattice structure, i.e. it is a question of open ducts or ducts that are fluidically connected together at least partially. The above-mentioned lattice can likewise consist only of struts or a corresponding grid, such that a large duct volume can serve for cooling the turbine blade 100.

The individual cooling ducts can have a diameter or a dimension of between 0.1 mm and 1 mm, for example as a result of the grid sizes of the lattice.

According to the invention, the outer wall portions 2 are advantageously closed wall portions. However, it is possible, in the scope of the present invention, for the cooling structure 10 to be formed at least partially within the outer wall portions 2 (cf. FIGS. 8 to 10 below). In FIG. 2, the outer wall portions are advantageously continuous wall portions through which the cooling structure 10 does not pass.

According to the invention—in contrast to the illustration in FIG. 1—a plurality of cooling-air bores 3 can be provided and formed in the end portion 1 of the turbine blade 100, in order, during operation of the turbine blade 100, to have a cooling fluid flowing through them from (radially) inside to (radially) outside (in other words from bottom to top in FIG. 2). As a result, in particular impingement cooling is realized for cooling the end portion 1.

During operation of the turbine blade 100, the cooling fluid is advantageously guided through the cooling-air bores 3 from the inside, wherein it subsequently flows through the cooling structure 10 and effectively cools the region of the turbine blade between the end portion 1 and blade tip 20 and thus protects the blade from mechanical, oxidative and/or corrosive wear. This cooling is in particular effective because the cooling structure forms a large cooling surface area and at the same time the cooling fluid experiences less resistance as a result of advantageously large diameters of the cooling ducts.

The cooling structure 10 is produced advantageously by an additive or generative manufacturing method, advantageously following the building up of the rest of or the basic structure for the turbine blade. Particularly advantageously, the cooling structure 10 is producible and/or produced by selective laser melting.

Particularly advantageously, the cooling structure 10 is built up on the end portion of conventional turbine blades in a maintenance or repair step ("refurbishment"). The cooling structure is additively built up on the end portion advantageously such that the cooling ducts are formed. According to the described method, the cooling structure is built up advantageously in a radial direction with an oversize, such that the expedient length of the entire turbine blade can be set (automatically) by abrasion. Abrasive sealing off of the radial gaps of turbine blades in general is already known from the prior art.

This method also advantageously allows the processing of the materials required for turbine blades, for example nickel- or cobalt-based superalloys.

Figure 3:
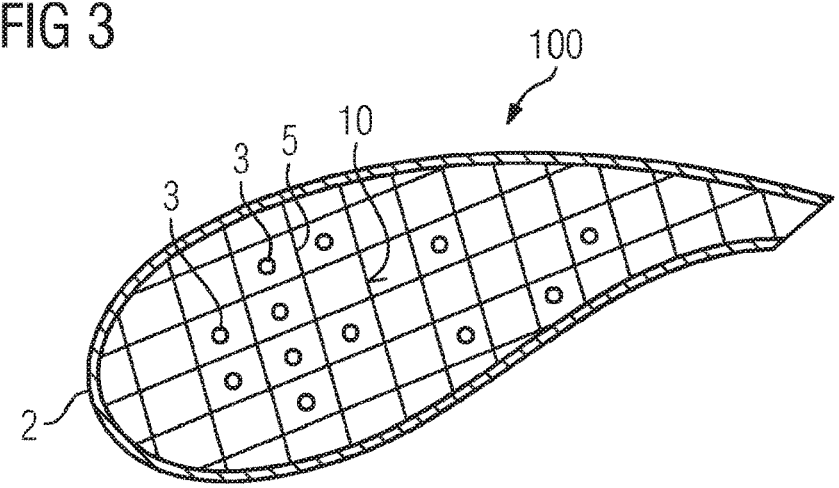
FIG. 3 schematically shows a plan view of a rubbing edge of a turbine blade of the present invention.

FIG. 3 shows a schematic plan view of the blade tip 20 of the turbine blade 100 illustrated in FIG. 2. FIG. 3 illustrates in particular a cross section (along a longitudinal axis of the turbine blade 100) or a plan view of the turbine blade 100, wherein the profile of the turbine blade is discernible. The outer wall portion 2 or an outer wall of the turbine blade is illustrated approximately circumferentially, wherein it can be interrupted only on a trailing edge (not explicitly illustrated) of the turbine blade 100.

Figure 4:
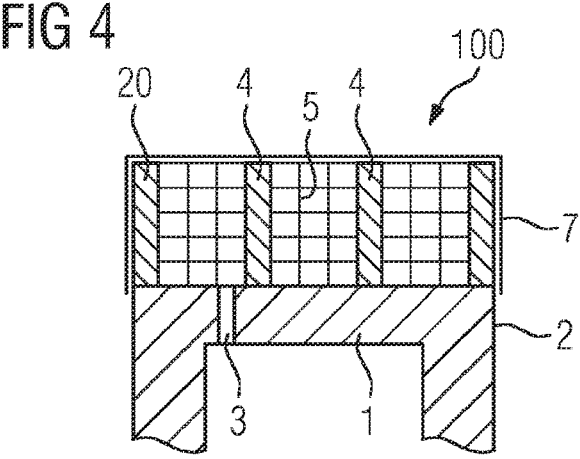
FIG. 4 schematically shows a cross section through a part of a turbine blade of the present invention in a further configuration.

FIG. 4 shows a schematic sectional view of a tip-side portion of a turbine blade 100 according to a further configuration of the present invention. In addition to the illustration in FIG. 2, two inner walls 4 are illustrated by way of example, which can act as an additional rubbing edge at the blade tip 20. As seen in the cross section of the turbine blade 100, the inner walls are expediently arranged within the outer wall portion 2.

As a result of this configuration, the rubbing edge of the turbine blade as a whole can be preserved particularly expediently from mechanical influences and consequently from wear. Although not explicitly illustrated, it is possible for further inner walls to be provided, in order to afford additional inventive advantages. Expediently, the inner walls 4 are arranged on the end portion 1 such that the cooling-air bores are not covered. The inner wall 4 extends—as illustrated—from the end portion in a radial direction expediently as far as the blade tip 20.

Furthermore, FIG. 4 shows that the turbine blade, in particular at least the outer wall portion 2, the blade tip 20, and the cooling structure 10 are provided with a coating 7. The coating 7 is advantageously a thermal barrier coating and/or oxidation-resistant coating. It can furthermore be a multiple coating, for example with a first, inner layer as oxidation protection, in particular with materials comprising MAX phases and/or MCrAlY alloys, and a second, outer layer for thermal insulation.

Figure 5:
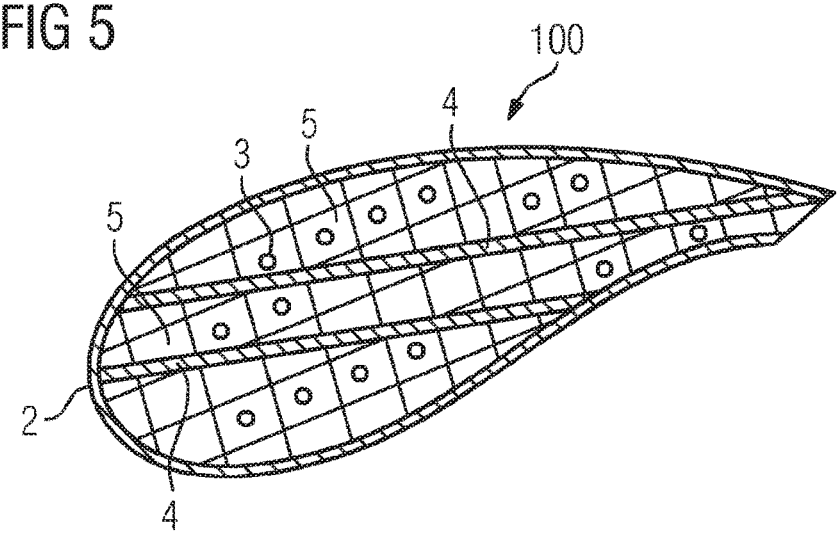
FIG. 5 schematically shows a plan view of a rubbing edge of a turbine blade of the present invention according to the configuration in FIG. 4.

FIG. 5 shows a schematic plan view of the blade tip 20 of the turbine blade 100 illustrated in FIG. 4. In accordance with the illustration in FIG. 4, two inner walls 4 arranged between the pressure side and suction side of the turbine blade (bottom and top) are identified.

Figure 6:
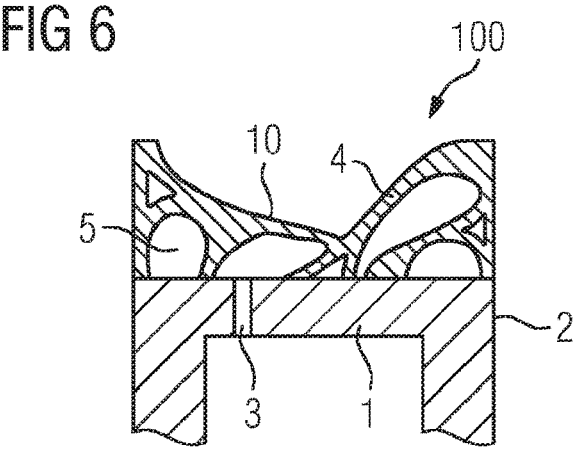
FIG. 6 schematically shows a cross section through a part of a turbine blade of the present invention in a further configuration.

FIG. 6 shows a schematic sectional view of a blade-side portion of a turbine blade 100 according to a further configuration of the present invention. According to this illustration, the cooling structure 10 is formed by an irregularly shaped, in particular bionically or biomimetically optimized or designed geometry. The latter can be for example a result of a simulation process or an optimization process, for example comprising genetic algorithms and/or comparable trial-and-error optimization steps. In particular, it is possible for parameters, such as the fluid resistance, the mechanical stability of the cooling structure and/or of the rubbing edge, or the thermal, mechanical, thermomechanical, oxidative or corrosive load during operation of the turbine blade 100, to be optimized for the design of the geometry. Furthermore, FIG. 6 reveals that the outer wall portions 2 are furthermore illustrated in a continuously closed manner, such that no cooling duct of the cooling structure 10 ends in or leads into the outer wall portions 2. As an alternative to this configuration, it is also possible for the cooling ducts 5 to lead into or end in the outer wall portions 2, however.

Figure 7:
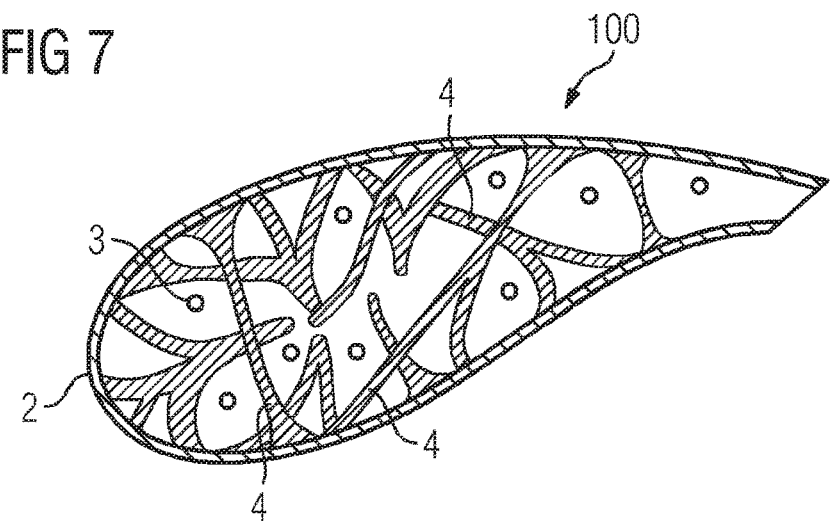
FIG. 7 schematically shows a plan view of a rubbing edge of a turbine blade of the present invention according to the configuration in FIG. 6.

FIG. 7 shows a schematic plan view of the blade tip 20 of the turbine blade 100 illustrated in FIG. 6. FIG. 7 reveals in particular that the irregular, bionic geometry of the cooling structure 10 according to this configuration is likewise distributed over the entire cross section of the turbine blade 100 or extends thereover.

Figure 8:
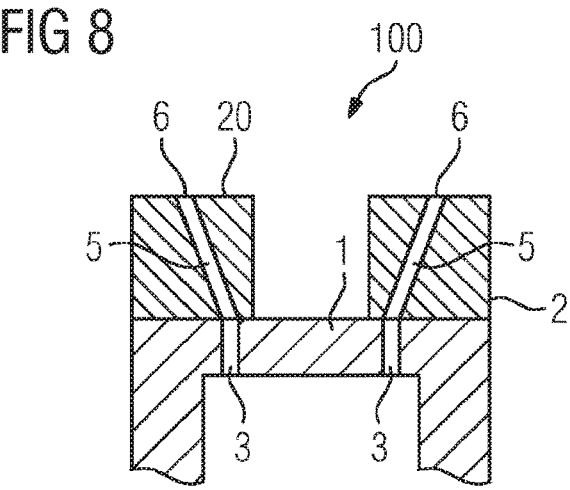
FIG. 8 schematically shows a cross section of a part of a turbine blade of the present invention in a further configuration.

FIG. 8 shows a schematic sectional view of a tip-side portion of a turbine blade 100 according to a further configuration of the present invention. As an alternative to the above-described figures, the cooling structure 10 according to this configuration is formed for example at least partially in the outer wall portions. As a further difference, the cooling structure is formed only in the region of the wall portions 2 and in the form of closed cooling ducts 5 or cooling ducts 5 that are fluidically separated from one another at least partially. However, the cooling structure 10 or the cooling ducts 5 are configured such that outlets or exit openings 6 of the cooling ducts 5—just as in the above-described examples—lead into or end in the rubbing edge and/or the blade tip 20.

It is furthermore apparent that the cooling-air bores 3 lead, on each side of the cross section shown, in each case into a duct structure (not explicitly indicated), i.e. into one or more cooling ducts that are each fluidically separated from one another at least partially. As a result of this configuration, the "cooling geometry" can be adapted specifically to particular "hot-spots" that arise during operation of the turbine blade 100.

The individual cooling ducts can, according to this configuration, each have for example diameters or dimensions of between 0.1 mm and 1 mm.

Figure 9:
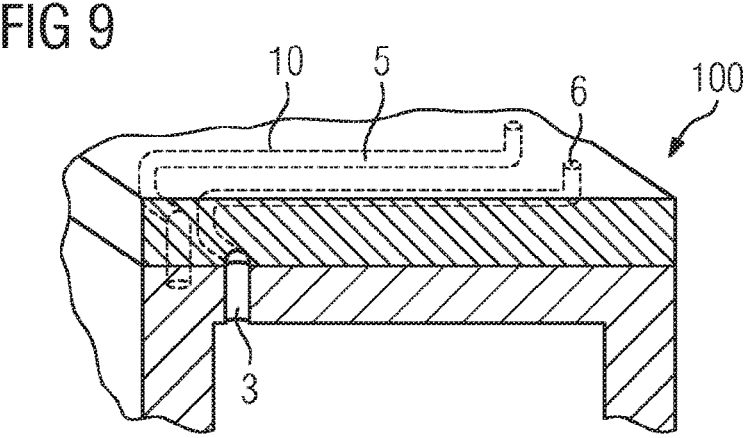
FIG. 9 schematically shows a cross section of a part of a turbine blade from an alternative perspective to FIG. 8.

FIG. 9 schematically shows a cross section of a part of a turbine blade from an alternative perspective compared with FIG. 8, for example in section along a different axis. The illustration in FIG. 9 should be understood in particular such that in each case one cooling duct 5 (as described above) adjoins in each case one cooling-air bore 3 (cf. FIG. 8) and this cooling duct 5 then extends within one of the outer wall portions 2, wherein only the outlet 6 is arranged at the surface of the blade tip 20 or the rubbing edge, such that the cooling fluid can pass out of the cooling structure 10 in each case also only through the outlet 6. It is furthermore apparent that the cooling ducts 5 extend advantageously substantially over the entire cross section and/or the entire provided area of the blade tip 20 or of a rubbing region.

Features or configurations of the different exemplary embodiments can be combined with one another in the present case to achieve the object of the invention. Thus, it is possible for example for a turbine blade to be provided, in which, in addition to the "duct cooling structure" illustrated in FIGS. 8 and 9, a "lattice cooling structure", as described in FIGS. 2 to 7, is present, without departing from the concept of the invention.

The invention is not limited to the exemplary embodiments by the description thereof, but rather encompasses every new feature and every combination of features. This includes in particular every combination of features in the claims, even when this feature or this combination itself is not explicitly specified in the claims or exemplary embodiments.

The invention claimed is:

1. A turbine blade, comprising:
   a blade tip,
   a cooling structure comprising a multiplicity of cooling ducts which are configured to have a cooling fluid flowing through them during operation in order to cool the turbine blade, wherein the cooling structure comprises a lattice structure which forms the multiplicity of cooling ducts,
   an end portion that is recessed with respect to the blade tip, and
   an outer wall portion which:
   projects from the end portion; and
   terminates at and defines the blade tip,
   wherein the end portion and the outer wall portion bound a region that is recessed in the blade tip, and wherein the cooling structure fills an entirety of the region.

2. The turbine blade as claimed in claim 1, wherein diameters of cooling ducts of the multiplicity of cooling ducts are between 0.1 mm and 1 mm.

3. The turbine blade as claimed in claim 1,
wherein cooling ducts of the multiplicity of cooling ducts that are fluidically separated from one another.

4. The turbine blade as claimed in claim 1, wherein the end portion comprises cooling-air bores.

5. The turbine blade as claimed in claim 1,
wherein the cooling structure is formed at least partially in the outer wall portion, and
wherein an outlet of cooling ducts of the multiplicity of cooling ducts leads into the blade tip.

6. The turbine blade as claimed in claim 1,
wherein the outer wall portion is a closed wall portion, and
wherein the cooling structure is at least partially enclosed by the outer wall portion.

7. The turbine blade as claimed in claim 1, further comprising:
between the blade tip and the end portion, a plurality of inner walls, which extend through the cooling structure.

8. The turbine blade as claimed in claim 1, wherein the blade tip comprises a thermal barrier layer and/or an oxidation-resistant layer.

9. The turbine blade as claimed in claim 1,
wherein the blade tip and/or the cooling structure are configured to form a rubbing edge during operation of the turbine blade.

10. The turbine blade as claimed in claim 1,
wherein the cooling structure and/or the outer wall portion are produced or producible by additive manufacturing or by selective laser melting.

11. A method for producing a cooling structure for a turbine blade as claimed in claim 1, comprising:
additively building of the cooling structure on the end portion of the turbine blade,
wherein the cooling structure is additively built up on the end portion such that the multiplicity of cooling ducts are formed,
wherein the multiplicity of cooling ducts are configured to have the cooling fluid flowing through them during operation in order to cool the turbine blade.

* * * * *